United States Patent [19]

Bruder

[11] Patent Number: 4,901,359

[45] Date of Patent: Feb. 13, 1990

[54] METHOD AND APPARATUS FOR AUTOMATICALLY CUTTING MATERIAL IN STANDARD PATTERNS

[75] Inventor: Wolfgang Bruder, Bielefeld, Fed. Rep. of Germany

[73] Assignee: Durkopp System Technik GmbH, Fed. Rep. of Germany

[21] Appl. No.: 937,880

[22] Filed: Dec. 4, 1986

[30] Foreign Application Priority Data

Dec. 14, 1985 [DE] Fed. Rep. of Germany ....... 3544251

[51] Int. Cl.[4] .............................................. G06K 9/00

[52] U.S. Cl. .......................................... 382/8; 382/61; 83/56; 235/464; 235/494

[58] Field of Search ........................... 382/8, 61, 1, 56; 83/56, 71, 925 CC; 235/464, 469, 494

[56] References Cited

U.S. PATENT DOCUMENTS

| | | | |
|---|---|---|---|
| 3,149,522 | 9/1964 | Newton | 235/469 |
| 3,513,320 | 5/1970 | Weldon | 235/469 |
| 3,801,775 | 4/1974 | Acker | 382/61 |
| 3,805,650 | 4/1974 | Pearl | 83/56 |
| 3,855,887 | 12/1974 | Pearl et al. | 83/925 CC |
| 3,881,379 | 5/1975 | Stumpf | 83/925 CC |
| 4,009,466 | 2/1977 | Clark | 235/469 |
| 4,140,037 | 2/1979 | Gerber | 82/925 CC |
| 4,327,615 | 5/1982 | Gerber et al. | 83/49 |
| 4,435,837 | 3/1984 | Abernathy | 382/41 |
| 4,495,845 | 1/1985 | Sherby | 82/925 CC |
| 4,544,064 | 10/1985 | Felder | 382/61 |
| 4,613,942 | 9/1986 | Chen | 235/469 |
| 4,721,058 | 1/1988 | Hayamizu et al. | 83/371 |

FOREIGN PATENT DOCUMENTS

| | | |
|---|---|---|
| 2265123 | 5/1976 | Fed. Rep. of Germany . |
| 1528278 | 7/1976 | Fed. Rep. of Germany . |
| 3408100 | 9/1985 | Fed. Rep. of Germany . |
| 2570315 | 3/1986 | France . |
| 2582317 | 11/1986 | France . |

OTHER PUBLICATIONS

*Bekleidùng und Wasche* 15, p. 20, col. 3, para. 3–5.

*Primary Examiner*—Leo H. Boudreau
*Assistant Examiner*—Michael Razavi
*Attorney, Agent, or Firm*—Ostrolenk, Faber, Gerb & Soffen

[57] ABSTRACT

A method and apparatus for controlling a cutting machine for automatically cutting material according to a standard pattern with an assigned name which has been placed on the material and machine-readable coding placed on the pattern that is represents of the name. Contour data are stored in a CNC-control pattern memory, which enable the cutting machine to cut along a contour defined by the pattern, when the pattern name is received. Coding is automatically detected on the pattern, and if present, the coding is read to determine the pattern name and its position on the cutting machine. The pattern name, and lateral and angular displacement data indicating of the position of the pattern are automatically supplied to control the cutting machine.

The apparatus comprises detecting and reading systems including an optical detector on the cutting machine producing a video output signal; a digital image memory; and an image decoding system. The digital image memory includes an input circuit for receiving the video output signal, comparing the video output signal against an adjustable threshold to produce binary video data, and generating a sync signal.

33 Claims, 8 Drawing Sheets

FIG. 4
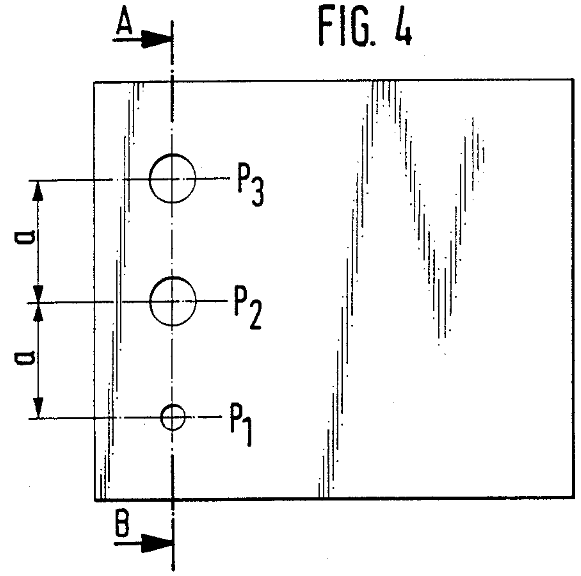
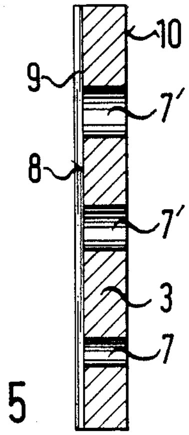
FIG. 5

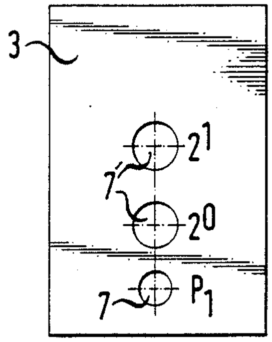
FIG. 6A
FIG. 6B
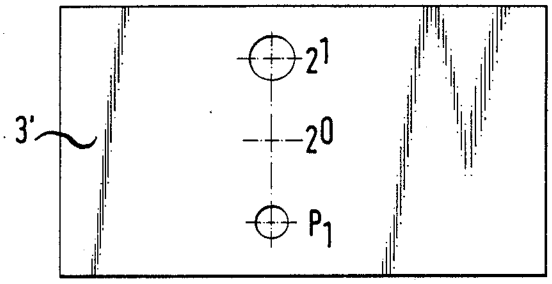
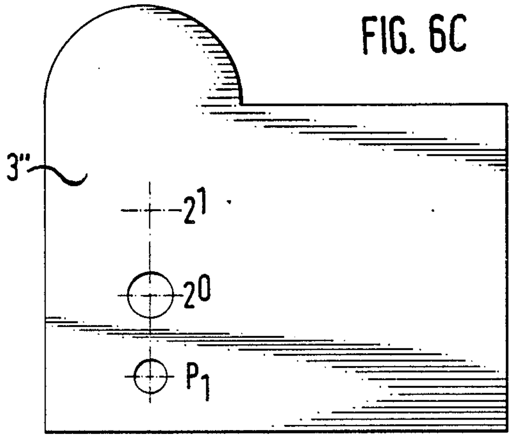
FIG. 6C

METHOD AND APPARATUS FOR AUTOMATICALLY CUTTING MATERIAL IN STANDARD PATTERNS

BACKGROUND OF THE INVENTION

1. Field of the Invention

The present invention relates to a method and apparatus for automatically cutting desired parts from cutting material in accordance with differently shaped standard patterns or templates. Such standard patterns may be placed prior to cutting on the cutting material, which may be spread on the work table of a coordinate cutting machine having a cutting tool which is movable according to two coordinates.

2. Description of Related Art

An apparatus for automatically cutting parts of goods from a flat textile material is known from Federal Republic of Germany Provisional Patent AS No. 22 65 123. In this apparatus, a turntable scanning device which controls the cutting tool of a coordinate cutting machine optically scans the contour of a standard pattern, the standard pattern being placed on the spread-out cutting material before the cutting process. A disadvantage of this apparatus is that scanning of a contour that may have any desired shape is time-consuming, and there are limits on the reproducibility of the contour if incisions directed transverse to the course of the contour are present.

Also known is a photoelectric scanning device for controlling a coordinate cutting machine, which can be braked in front of the points of change of direction of the cutting-pattern. This device, disclosed in Federal Republic of Germany Provisional Patent AS No. 23 25 389, is suitable for a coordinate cutting machine which operates with a high speed of travel. Since, in this prior cutting machine as well, the contour of the cutting pattern must be scanned prior to cutting, which requires a great deal of time, the cutting system is inefficient. Incisions directed transverse to the course of the contour cannot be precisely detected by this scanning device either, so that the degree of reproducibility is reduced.

SUMMARY OF THE INVENTION

Accordingly, a primary object of the present invention is to develop a method by which any pattern applied at any place on a cutting material may be located and identified by optical sensing before the automatic cutting of a part from the cutting material.

A further object is to provide a device for carrying out the method, by which the movement of a cutting tool, which is to be effected in two coordinates, can be carried out rapidly, and with a high degree of precision that is limited only by the quality of the coordinate cutting machine.

According to one aspect of the invention, the method comprises assigning a name to the pattern, placing machine-readable coding on the pattern that is representative of the name, and storing contour data, which enable the cutting machine to cut along a contour defined by the pattern, in a pattern memory of the cutting machine. The contour data are associated in the pattern memory with the name of the corresponding pattern. The material to be cut is placed on the cutting machine, and the pattern is placed on the material. Then it is automatically detected whether coding is present on the pattern, and if so, the coding is read to determine the name of the pattern and its position on the cutting machine. Data indicative of the name and position of the pattern are automatically supplied to the cutting machine to control the cutting machine to cut along the contour defined by the pattern.

Advantageously, the data indicative of the position of the pattern include X and Y data indicative of the X-Y displacement of the coding from a reference point, and angle data indicative of the angular displacement of the coding with respect to a reference axis on the cutting machine. The coding preferably comprises two types of code marks arranged in a grid arrangement on the pattern.

Detecting and reading apparatus that is particularly well adapted for practicing the method comprises an optical detector on the cutting machine producing a video output signal; a digital image memory for storing the video output signal; and an image decoding system for receiving the stored video output signal. The image decoding system determines whether coding is present on the work surface, and if so, generates control data indicative of the name and position of the pattern on the work surface.

The digital image memory advantageously includes input means for receiving the video output signal from the optical detector, for comparing the video output signal against an adjustable threshold to produce binary video data, and for generating a sync signal related to the video output signal. The digital image memory also includes instruction means for receiving the sync signal and generating storage instructions; buffer means for receiving and storing the binary video data from the input means; and memory means for receiving and storing the binary video data from the buffer means.

By the method of the invention it is now possible, before the sewing material is cut, to rapidly and reliably identify standard patterns placed manually on the material to be cut, with respect to their contour and their position on the cutting material, without any prior scanning of the contour of the standard pattern being necessary. According to the method, data corresponding to the course of the contour of all desired patterns are pre-stored in a storage device which is part of the CNC control of the coordinate cutting machine. Thus, recognition of the cutting pattern is enhanced. Even when there is low contrast between the surface of the standard pattern and the surface of the cutting material, there is no detrimental effect on the reliable recognition of the position and form of the sample pattern.

The method further makes it possible to place the cutting pattern on any portion of the cutting material, and the specific portion may differ from case to case. In this way, it is assured that the pattern may be placed away from defective parts of the cutting material, for instance in the case of leather skins.

By this method, the course of the contour of the part cut out can reliably track the contour of the standard pattern.

Another very advantageous use of the method of the invention resides in the automatic cutting of flat textile material having a color pattern which consists of checks, stripes or the like. In this case a top surface of the standard cutting pattern is additionally provided with markings which permit the standard pattern to be placed in proper register on the material to be cut, which allows a part to be cut from the textile material in proper relation with the color pattern.

In the apparatus of the invention, a cutting tool is immediately provided with information as to the standard pattern that has just been recognized, with respect to its contour and its position on the cutting material, and the cutting tool is thereby given adjustment commands corresponding to the contour and the instantaneous position of the standard pattern, to cause it to move over the proper path in two coordinates.

An embodiment which is directed specifically toward an apparatus for cutting out parts with a coherent high-pressure jet, in a water-jet cutting system, will be explained with reference to FIGS. 1 to 11. On the other hand, the method of the invention may also be employed in coordinate cutting machines in which the cutting material is cut by a knife which is moved up and down, for example, or by a laser beam.

BRIEF DESCRIPTION OF THE DRAWINGS

Other objects, features, and advantages of the invention will be appreciated from the following description of detailed embodiments thereof, with reference to the accompanying drawings, in which:

FIG. 4 is a top view of an example of a standard pattern, the pattern having coding thereon which includes three holes;

FIG. 5 is a sectional view taken along section line A–B of FIG. 4;

FIGS. 6A, 6B and 6C are top views showing three different examples of standard patterns which can be reliably identified by their respective coding;

DETAILED DESCRIPTION OF PREFERRED EMBODIMENTS

Figure 1:
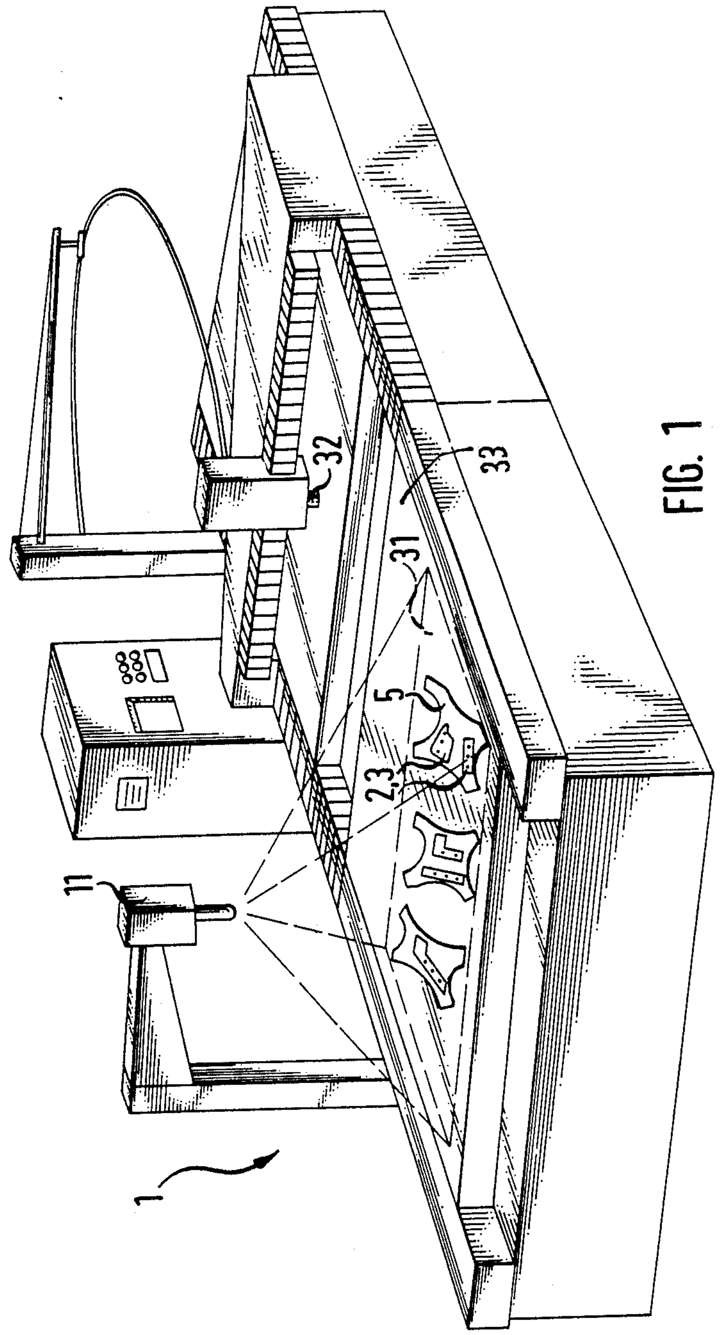
FIG. 1 is a simplified perspective view of a water-jet cutting system.

Referring to FIG. 1, there is seen a coordinate cutting machine 1 whose cutting tool 32 comprises a nozzle which can be moved in two coordinates by a suitable mechanical system, for instance by a carriage which is displaceable in two directions. From the nozzle there emerges a coherent high-pressure jet, preferably a hair-fine water jet of 0.1 to 0.3 mm diameter with a pressure of up to 4000 bar. The water jet impinges on the material to be cut, for instance a leather skin 5, which is laid out on a work table 33, and cuts a part 2 from the cutting material 5 in accordance with a predetermined contour defined by a standard pattern 3.

Figure 2:
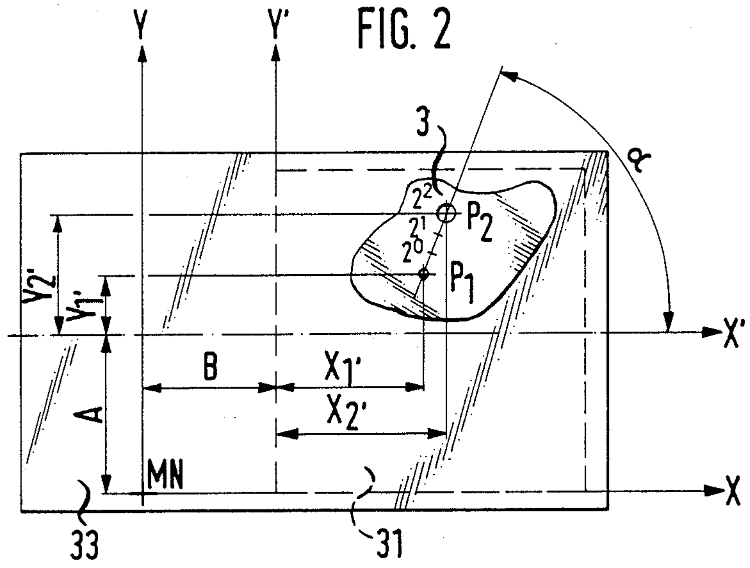
FIG. 2 is a top view of the work table of the cutting system, on which a standard pattern has been placed in the field of recognition of an electronic camera.
Figure 3:
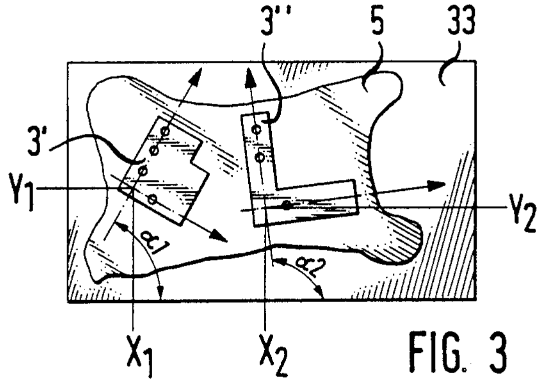
FIG. 3 is a top view of a piece of cutting material spread out on the work table, with two standard patterns placed thereon.

Above the cutting location is an electronic camera 11, for instance a line-resolving or arearesolving camera, which is capable of performing optical sensing in a defined recognition area 31 on the work table 33. A plurality of standard patterns 3 are placed, before the cutting process, on the cutting material 5, which is a flat material in this example, and which is spread out within the region of the recognition area 31 (FIGS. 2, 3). The patterns may be made of cardboard, plastic sheet or metal plate, for example. Each standard pattern 3 has coding thereon for identifying the standard pattern, the coding comprising at least two holes 7, 7'.

In this embodiment of the invention, one hole 7 has a small diameter. In FIGS. 2, 4 and 6A–6C the center of this hole 7 is designated P1. The other one or more holes, designated 7', have a larger diameter.

The diameters of the holes 7, 7' are selected according to the resolving power of the camera 11. The holes 7, 7' having thus defined diameters are placed in a grid arrangement wherein adjacent holes are spaced by multiples of a standard spacing distance "a" (see FIG. 4), the standard hole spacing distance "a" being known to a central processor 6. In order to indicate various distinct codings, the holes 7, 7' may be arranged in a straight line, as shown in FIGS. 2, 4 and 6A–6C; in two or more intersecting lines in accordance with FIG. 3; or in two or more parallel lines.

The coding, which unambiguously characterizes different standard patterns, is explained with reference to FIGS. 6A–6C, which show three examples of standard cutting patterns 3, 3', 3''. Each of the standard patterns shown in FIGS. 6A–6C has, as previously described, a smaller hole 7, whose center is marked P1. The upper standard pattern 3 (FIG. 6A) has furthermore two holes 7' of larger diameter. The center of the middle hole forming part of this coding is marked $2^0$, and the center of the upper hole is marked $2^1$. This coding can be interpreted as a binary value, namely $1\times2^1+1\times2^0$, which equals 11. The decimal number corresponding to this binary value is 3, and this decimal number is referred to as the "name" of the corresponding standard pattern 3.

The standard pattern 3' (FIG. 6B) is characterized by a coding which has only one hole 7' of larger diameter. In this example, the point that is centrally located in the grid between the large hole 7' and the small hole 7 is not occupied by a hole. Thus, the binary value characteristic of the standard pattern 3' is interpreted as $1\times2^1+0\times2^0$, which equals 10. This binary value corresponds to the decimal number 2, which is the "name" of the standard pattern 3'.

The standard pattern 3'' (FIG. 6C) is characterized by a coding which also has only one hole 7' of larger diameter, the point in the grid corresponding to the number $2^1$ not being occupied by a hole. Thus, the binary value characterizing the standard pattern 3'' is interpreted to be $0\times2^1+1\times2^0$, which equals 01. This binary value corresponds to the decimal number 1, which is the "name" of the standard pattern 3''.

From what has just been stated it is seen that, depending on the number and arrangement of holes 7, 7' provided in the grid, each standard pattern can be designated by a decimal number derived from the binary value which corresponds to its code. In this connection, it is entirely immaterial where on the standard pattern in question the coding holes are located.

In this case, the holes 7, 7' are covered on the bottom 8 of the standard pattern 3 by a black cover strip 9 (FIG. 5), the black color assuring a sufficient contrast relationship with respect to the top side 10 of the standard pattern 3 which can be reliably recognized, according to the setting of an adjustable threshold switch 14 which forms part of a digital image memory 12, by analog or digital adjustment.

Referring to FIG. 2, the center of the small hole 7 (designated P1) represents the zero point of the standard pattern. This point is the basic reference point for the recognition of any given standard pattern 3. Furthermore, a so-called machine zero point MN is established which serves as a reference point for the distances between the centers of the holes 7, 7' belonging to the coding.

Figure 11:
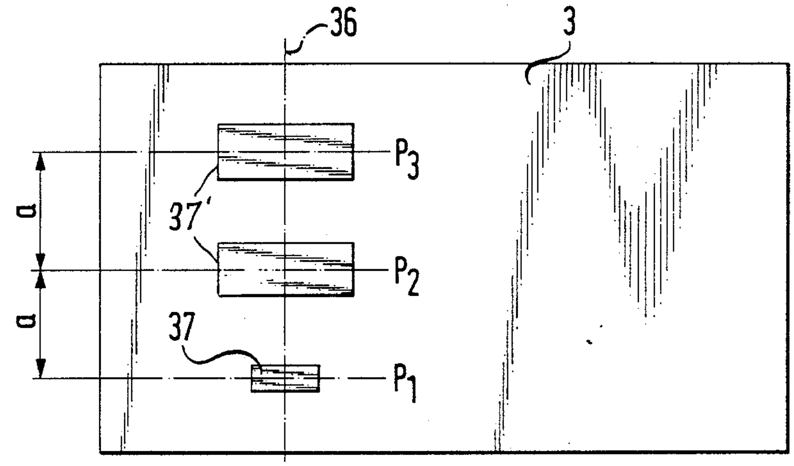
FIG. 11 is a top view showing another example of a standard pattern, having coding thereon which includes three rectangular areas.

In an alternate embodiment of the invention, shown in FIG. 11, the coding of a standard pattern 3 may take the form of so-called bar coding. In this example, the center P1 of a smaller bar-shaped area 37 may correspond to the standard pattern zero point, and the areas 37' provided above it are arranged—like the previously mentioned holes 7'—within a grid, with maintenance of constant distances between the areas. If it is desired to avoid the above-mentioned practice of covering the holes 7, 7' by the cover strip 9, the areas 37 may be applied in suitable manner to the top 10 of the corresponding standard pattern 3 in such a way that they are substantially resistant to being rubbed off or otherwise damaged.

Figure 7:
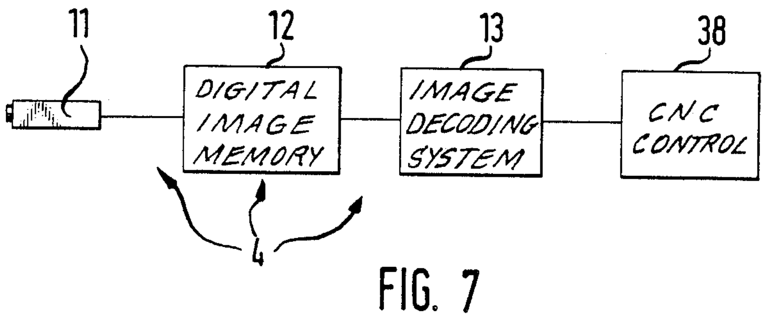
FIG. 7 is a block diagram of a standard-pattern identification device which is usable in the invention.
Figure 9:
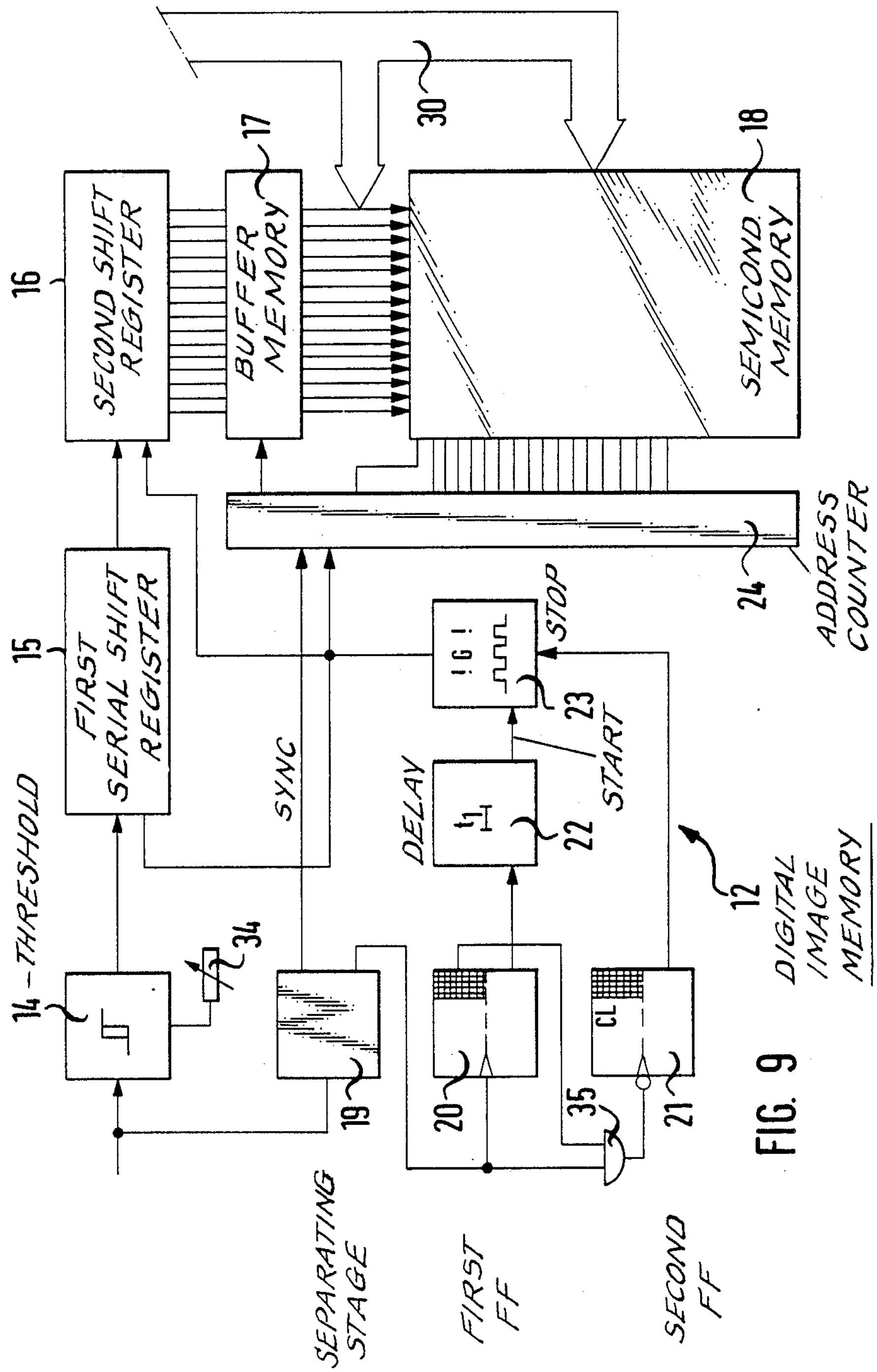
FIG. 9 is a circuit diagram of a digital image memory as in FIG. 7 which is usable in the invention.
Figure 10:
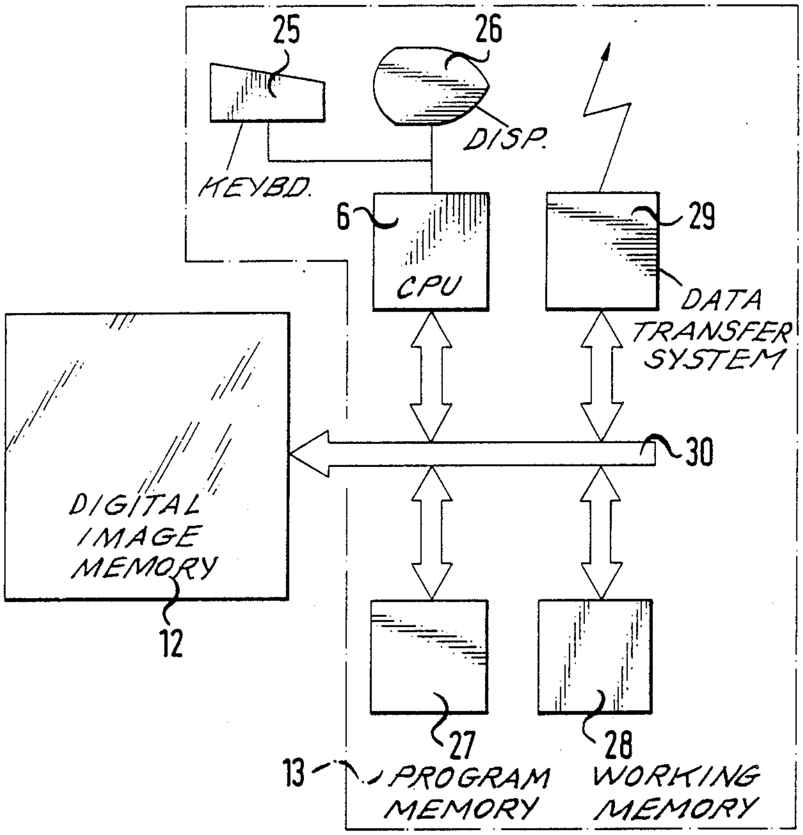
FIG. 10 is a block diagram showing a digital image memory and an image decoding system as in FIG. 7.

Now referring to FIG. 7, a standard pattern identification system 4 comprises the electronic camera 11, the digital image memory 12, and an image decoding system 13, by which dependable optical sensory recognition of position and identification of each standard pattern 3 is performed. Contour data corresponding to each standard pattern 3 are stored in a pattern-program memory belonging to the computerized numerical control (CNC control) 38 of the coordinate cutting machine 1. The circuitry of the digital image memory 12 is shown in FIG. 9. Referring to FIG. 10, a bidirectional data bus 30 interconnects the digital image memory 12 and the image decoding system 13, the latter including a central processor 6, a program memory 27 such as a ROM for storing the decoding program, a working memory 28 such as a RAM, and a data transfer system 29 such as a serial or parallel output port for transferring data to the CNC control 38.

The operation of the apparatus and of the optical identification and locating of standard patterns in accordance with the method will now be described, with reference to FIGS. 7–10.

The image of a standard pattern 3 detected by the camera 11, assuming the use of a video camera, is broken down into lines and fed, for the processing of the signal, to the digital image memory 12, shown in FIG. 9. The threshold switch 14, which may be adjustable in analog fashion by a potentiometer 34, establishes a switching point for distinguishing between a black value and a white value in the video signal. The adjustment of the threshold switch 14 may also, of course, be effected digitally.

At the same time, the video signal is fed to a separating stage 19 which, inter alia, produces a sync signal which is transferred to an address counter 24. The sync signal is processed to modify the memory address as a function of whether the first or second field of a video frame is being scanned, i.e., it serves to provide respective memory addresses for the first and second fields of a given frame.

The separating stage 19 furthermore generates a second output signal whose edges produce a start signal and a stop signal. The start signal is generated by a first flip-flop stage 20 and a delay stage 22 which receives the output of the first flip-flop stage 20 and provides a delay time t1. The stop signal is generated by a second flip-flop stage 21. The start and stop signals are provided for the control of a square wave generator 23. Thus, the square wave generator 23 is connected with a delay equal to the scanning time of the video signal. The input to the second flip-flop stage 21 is, as shown in FIG. 9, provided by a gate 35 which receives an output of the first flip-flop stage 20 as well as the second output signal from the separating stage 19.

The circuitry of FIG. 9 initially distinguishes between black and white values in the video signal. If the voltage value of the video signal is less than the threshold value and therefore "black," then, in a first serial shift register 15, a "zero" is entered in synchronism with the square wave. If the voltage value of the video signal is greater than the threshold value, i.e., "white," then the number "one" is entered in the first shift register 15. After the 16th pulse, a second shift register 16, which has a serial input and a parallel output, is also filled and its output is loaded into the buffer memory 17. Simultaneously with a memory pulse given off by the address counter 24, the data in the buffer memory 17 are entered in a semiconductor memory 18. Assuming each picture line detected by the camera 11, i.e., a set of digital black/white values in accordance with the preset threshold value, has been broken down into 256 digital steps, the content of a total line will be contained in sixteen directly successive memory addresses. The size of the digital steps depends on the desired resolution, and is not limited to 256 image points.

Figure 8:
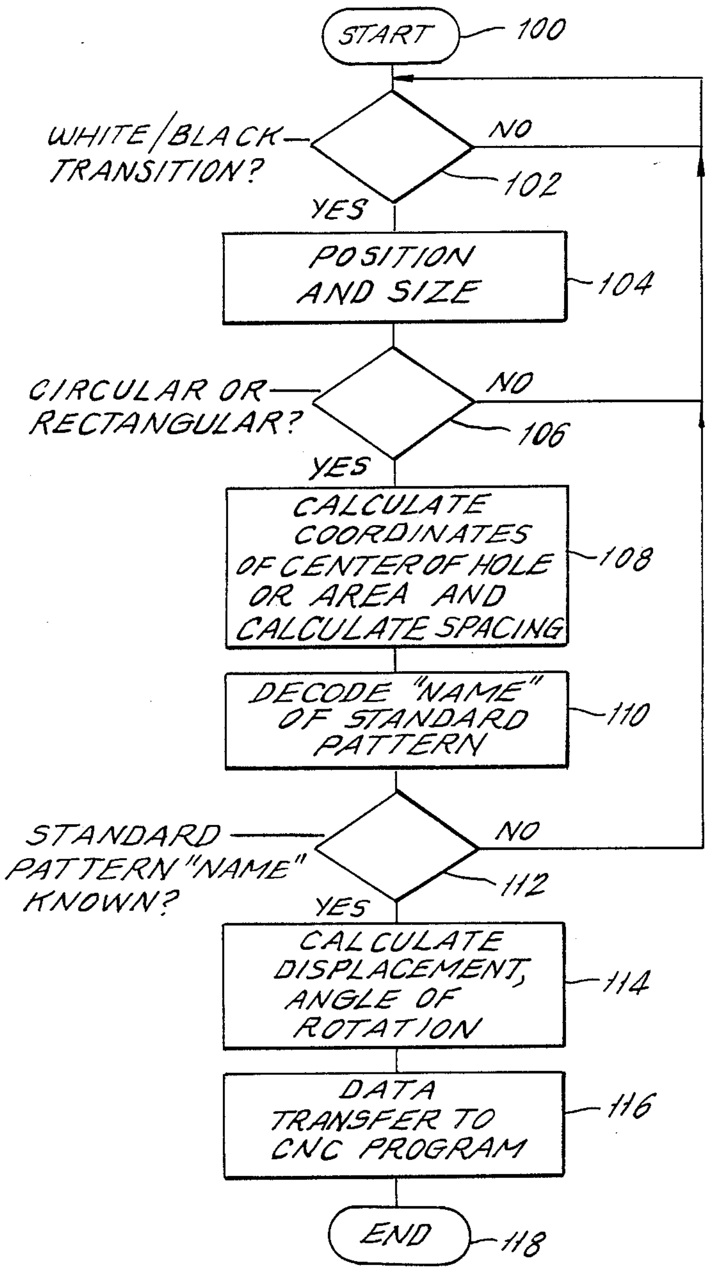
FIG. 8 is a flow chart showing a procedure for the unequivocal identification of a standard pattern.

Referring to FIGS. 7 and 10, the digital image memory 12 is connected by a data bus 30 to an image decoding system 13. The image decoding system 13 may be a microcomputer or a similar apparatus, and includes, as shown in FIG. 10, the following components:

(a) a central processor 6, which calculates values from the image data stored in the digital image memory 12, such as the variables L1, L2 and L3 explained below;

(b) a program memory 27, which contains the computation program, corresponding to the flowchart shown in FIG. 8;

(c) a working memory 28 by which the value assignments for the variables L1, L2 and L3 are established; and (d) a data transfer system 29, which communicates an identified "name" corresponding to the detected standard pattern 3, and the variables calculated by the processor 6 as parameters L1, L2 and L3, to the CNC control 38 of the coordinate cutting machine 1. Although the data transfer system 29 is contemplated to provide a serial interface, a parallel interface also could be provided.

The data collected in the digital image memory 12 are analyzed in accordance with the flowchart of FIG. 8 for detecting circular holes or rectangular areas, and determining the centers of all holes 7, 7' or areas 37, 37' belonging to the coding of the corresponding standard pattern 3. The decoding and calculating process in accordance with FIG. 8 is started by the inputting of the program start conditions on an alpha-numeric keyboard 25. The keyboard 25 and a display 26 are connected to the processor 6 (see FIG. 10). The digitized image of the recognition area 31 (see FIG. 2) is shown on the display 26.

The image broken down into lines by the camera 11 is then analyzed by the image decoding system 13 in relation to the recognition area 31 and the content of the digital image memory 12 (FIG. 8, steps 102–108), to locate the coding centers and thereby determine their direct coordinate measurements Y2′, X2′ and Y1′, X1′ (see FIG. 2). The diameters of the circular holes 7, 7′ or the dimensions of the rectangular areas 37, 37′ are determined. A set of new reference axes X′ and Y′ (see FIG. 2) are fixed in relation to the coordinate measurements of the recognized coding centers (step 114). The center of the smaller hole 7 or of the smaller rectangular area 37 in this connection establishes the zero point for locating the standard pattern, while the position of the larger hole or holes 7′ (for instance P2 in FIG. 2) or the larger areas 37′ (as in FIG. 11), establish the coding of the corresponding standard pattern 3 and the path P1–P2. Furthermore, an angle alpha is determined by the processor 6, which is defined by the path P1–P2 and the reference axis X′.

A variable L3 is set by the processor 6 to a value that is representative of the angle alpha. Furthermore the coordinate measurements of the centers of all the small holes 7 or areas 37, which correspond to a displacement of the standard pattern zero point, due to placing the standard pattern 3 in a desired place on the cutting material 5, are assigned to the variables L1 and L2.

The following example, read with reference to FIGS. 2 and 8, will further explain what has just been said.

At steps 100–108 in FIG. 8, the video image is analyzed to detect white/black transitions (102); determine the geometry of such transitions detected (104); and determine when a circular hole or rectangular area has been detected (106). If so, then at 108, the coordinates of the coding centers P1 (X1′, Y1′) and P2 (X2′, Y2′) are determined.

Then, at 110, the decoding system 13 determines the binary value 100 ascribed to the grid arrangement of points P1 and P2, which corresponds to the decimal number 4. The decimal number 4 is assumed to be the "name" of the standard pattern being examined. The "name" is tested at 112 to confirm that the detected grid arrangement has in fact indicated a valid "name." If not, the process returns to step 102 and analysis of the contents of the digital image memory 12 begins again.

Then, at 114, the processor 6 calculates:

The angle alpha which defines the position of the standard pattern 3 with respect to the horizontal, at any desired place on the cutting material 5, for instance the reference axis X′, whereby $$\tan \text{alpha} = \frac{Y2' - Y1'}{X2' - X1'} = L3$$

The coordinates of the instantaneous position of the center P1 with respect to the machine zero point MN:

$$L1 = X1' + B$$

$$L2 = Y1' + A$$

At 116, the variables L1, L2 and L3 which have just been determined, as well as the "name" characterizing the standard pattern 3 in question, are fed to the CNC control 38 of the coordinate cutting machine 1 via the data transfer system 29. Based on the communicated "name" of the standard pattern 3, a subprogram corresponding to the course to be followed by the cutting tool is called up, having been previously stored in data form in a pattern program memory of the CNC control 38. The cutting tool 32 is now able to cut from the cutting material 5 the part 2 corresponding to the previously identified standard pattern 3, doing so as a function of its position, which has been shifted by the coordinate dimensions X1′+B and Y1′+A and turned through the angle alpha. As already mentioned, it is not necessary for this purpose to scan the contour of the corresponding standard pattern 3 prior to cutting, which leads to the advantages discussed previously.

Although illustrative embodiments of the invention have been described in detail, the same has been for purposes of illustration and not limitation. Rather, the invention is to be defined only by the terms of the claims.

What is claimed is:

1. A method of controlling a cutting machine having a pattern memory, for automatically cutting material in accordance with a standard pattern, comprising the steps of:

assigning a name to the pattern;

storing contour data, which enable the cutting machine to cut along a contour defined by the pattern, in the pattern memory of the cutting machine, and associating the contour data in the pattern memory with the name of the corresponding pattern;

placing machine-readable coding on the pattern that is representative of the name of the pattern;

placing the material to be cut onto the cutting machine, and placing the pattern at a desired position on the material;

automatically detecting whether coding is present on the pattern, and if so, reading the coding to determine therefrom the name of the pattern and its position on the cutting machine; and automatically supplying data indicative of the name and position of the pattern to the cutting machine and thereby controlling the cutting machine to cut along the contour defined by the pattern at the position of the pattern.

2. A method as in claim 1, further comprising steps of:

assigning respective names to a plurality of distinct patterns that are placeable on the material;

placing machine-readable coding within the contours of each of the patterns that is representative of the name of the pattern; and storing respective contour data for each pattern and associated with the name of the corresponding pattern, in the pattern memory of the cutting machine.

3. A method as in claim 1, wherein the material to be cut is flat and is placed on the worktable of a coordinate cutting machine having a cutting tool that is movable in two coordinates, and the coding is automatically read by an optical detector fixed to the cutting machine.

4. A method as in claim 1, wherein the data indicative of the position of the pattern include X and Y data indicative of the X-Y displacement of a predetermined portion of the coding from a reference point on the cutting machine, and angle data indicative of the angular displacement of said coding with respect to a reference axis on the cutting machine.

5. A method as in claim 4, wherein the coding placed on the pattern comprises one code mark of a first type and at least one code mark of a second type, a grid arrangement being defined on the pattern and the name of the pattern being defined according to the location of the code marks on the grid arrangement.

6. A method as in claim 5, wherein the first and second types of code marks are substantially circular and have different diameters.

7. A method of controlling a cutting machine having a pattern memory, for automatically cutting material in accordance with a standard pattern, comprising the steps of:

assigning a name to the pattern;

storing contour data, which enable the cutting machine to cut along a contour defined by the pattern, in the pattern memory of the cutting machine, and associating the contour data in the pattern memory with the name of the corresponding pattern;

placing machine-readable coding on the pattern that is representative of the name of the pattern;

placing the material to be cut onto the cutting machine, and placing the pattern at a desired position on the material;

automatically detecting whether coding is present on the pattern, and if so, reading the coding to determine therefrom the name of the pattern and its position on the cutting machine; and automatically supplying data indicative of the name and position of the pattern to the cutting machine and thereby controlling the cutting machine to cut along the contour defined by the pattern at the position of the pattern;

wherein the data indicative of the position of the pattern include X and Y data indicative of the X-Y displacement of a predetermined portion of the coding from a reference point on the cutting machine, and angle data indicative of the angular displacement of said coding with respect to a reference axis on the cutting machine;

wherein the coding placed on the pattern comprises one code mark of a first type and at least one code mark of a second type, a grid arrangement being defined on the pattern and the name of the pattern being defined according to the location of the code marks on the grid arrangement;

wherein the first and second types of code marks are substantially circular and have different diameters; and wherein the code marks comprise holes in the pattern and a cover strip is placed over the holes on a bottom surface of the pattern to provide the holes with color contrast with respect to a top surface when the holes are optically viewed from above

8. A method of controlling a cutting machine having a pattern memory, for automatically cutting material in accordance with a standard pattern comprising the steps of:

assigning a name to the pattern;

storing contour data, which enable the cutting machine to cut along a contour defined by the pattern, in the pattern memory of the cutting machine, and associating the contour data in the pattern memory with the name of the corresponding pattern;

placing machine-readable coding on the pattern that is representative of the name of the pattern;

placing the material to be cut onto the cutting machine, and placing the pattern at a desired position on the material;

automatically detecting whether coding is present on the pattern, and if so, reading the coding to determine therefrom the name of the pattern and its position on the cutting machine; and automatically supplying data indicative of the name and position of the pattern to the cutting machine and thereby controlling the cutting machine to cut along the contour defined by the pattern at the position of the pattern;

wherein the data indicative of the position of the pattern include X and Y data indicative of the X-Y displacement of a predetermined portion of the coding from a reference point on the cutting machine, and angle data indicative of the angular displacement of said coding with respect to a reference axis on the cutting machine;

wherein the coding placed on the pattern comprises one code mark of a first type and at least one code mark of a second type, a grid arrangement being defined on the pattern and the name of the pattern being defined according to the location of the code marks on the grid arrangement; and wherein the first and second types of code marks are substantially rectangular and have different areas.

9. A method as in claim 8, wherein the code marks are applied to a top surface of the pattern and are colored so as to provide the code marks with color contrast with respect to the top surface when optically viewed from above.

10. A method as in claim 8, wherein the rectangular code marks are arranged symmetrically with respect to the grid arrangement.

11. A method as in claim 5, wherein the step of reading the coding includes locating the centers of the code marks.

12. A method of controlling a cutting machine having a pattern memory, for automatically cutting material in accordance with a standard pattern, comprising the steps of:

assigning a name to the pattern;

storing contour data, which enable the cutting machine to cut along a contour defined by the pattern, in the pattern memory of the cutting machine, and associating the contour data in the pattern memory with the name of the corresponding pattern;

placing machine-readable coding on the pattern that is representative of the name of the pattern;

placing the material to be cut onto the cutting machine, and placing the pattern at a desired position on the material;

automatically detecting whether coding is present on the pattern, and if so, reading the coding to determine therefrom the name of the pattern and its position on the cutting machine; and automatically supplying data indicative of the name and position of the pattern to the cutting machine and thereby controlling the cutting machine to cut along the contour defined by the pattern at the position of the pattern;

wherein the data indicative of the position of the pattern include X and Y data indicative of the X-Y displacement of a predetermined portion of the coding from a reference point on the cutting machine, and angle data indicative of the angular displacement of said coding with respect to a reference axis on the cutting machine;

wherein the coding placed on the pattern comprises one code mark of a first type and at least one code mark of a second type, a grid arrangement being defined on the pattern and the name of the pattern being defined according to the location of the code marks on the grid arrangement; and wherein the grid arrangement includes at least a first axis having a plurality of equally spaced positions defined thereon, the name of the pattern being determined according to which defined positions are occupied by the code marks.

13. A method as in claim 12, wherein the code marks are substantially circular and the grid arrangement includes at least a second axis defined perpendicular to the first axis.

14. A method as in claim 12, wherein the code marks are substantially circular and the grid arrangement includes at least a second axis defined parallel to the first axis.

15. A method as in claim 5, wherein the predetermined portion of the pattern whose X-Y displacement is detected is the center of the code mark of the first type, and the angular displacement of the coding is detected by detecting the angular displacement of the grid arrangement.

16. A method as in claim 1, wherein the coding on the pattern represents binary data, and the name of the pattern is in decimal form, and further comprising the step of converting the binary coding data to the name in decimal form.

17. An apparatus for automatically controlling a cutting machine to cut material thereon in accordance with a standard pattern placed at a desired position on the material, the apparatus comprising:

pattern memory means in the cutting machine for storing contour data enabling the cutting machine to cut along a contour defined by the pattern, and storing a corresponding pattern name associated with the contour data; and means for detecting whether coding is present on such pattern, and if so, reading the coding to determine therefrom a pattern name represented by the coding, and to determine the position of the pattern on the cutting machine; and for automatically supplying data indicative of the name and position of the pattern to the cutting machine, and thereby controlling the cutting machine to cut along the contour defined by the pattern at the position of the pattern.

18. An apparatus as in claims 17, wherein the pattern memory means in the cutting machine is capable of storing respective contour data corresponding to a plurality of patterns, and a corresponding plurality of pattern names associated therewith.

19. An apparatus as in claim 17, wherein the cutting machine comprises a work surface for receiving the material to be cut, and a cutting tool movable in two dimensions for cutting the material on the work surface.

20. An apparatus as in claim 17, wherein the cutting machine has a work surface, and the detecting and reading means comprises an optical detector on the cutting machine producing a video output signal representative of objects on the work surface;

a digital image memory for storing the video output signal as stored video data; and an image decoding system for receiving the stored video data and determining therefrom whether coding is present on a pattern on the work surface, and if so, generating control data indicative of the name and position of the pattern on the work surface.

21. An apparatus as in claim 20, wherein the cutting machine comprises a CNC control which receives the control data and also includes the pattern memory means.

22. An apparatus as in claim 20, wherein the optical detector includes an electronic camera.

23. An apparatus as in claim 22, wherein the electronic camera is a line-resolving camera.

24. An apparatus as in claim 22, wherein the electronic camera is an area-resolving camera.

25. An apparatus for automatically controlling a cutting machine to cut material thereon in accordance with a standard pattern placed at a desired position on the material, the apparatus comprising:

pattern memory means in the cutting machine for storing contour data enabling the cutting machine to cut along a contour defined by the pattern, and storing a corresponding pattern name associated with the contour data; and means for detecting whether coding is present on such pattern, and if so, reading the coding to determine therefrom a pattern name represented by the coding, and to determine the position of the pattern on the cutting machine; and for automatically supplying data indicative of the name and position of the pattern to the cutting machine, and thereby controlling the cutting machine to cut along the contour defined by the pattern at the position of the pattern;

wherein the cutting machine has a work surface, and the detecting and reading means comprises an optical detector on the cutting machine producing a video output signal representative of objects on the work surface;

a digital image memory for storing the video output signal as stored video data; and an image decoding system for receiving the stored video data and determining therefrom whether coding is present on a pattern on the work surface, and if so, generating control data indicative of the name and position of the pattern on the work surface; and wherein the digital image memory comprises input means for receiving the video output signal from the optical detector, comparing the video output signal against an adjustable threshold to produce binary video data, and also generating a sync signal related to the video output signal;

instruction means for receiving the sync signal and generating storage instructions;

buffer means for receiving the storage instructions and in response thereto storing the binary video data from the input means; and memory means for receiving the storage instructions and in response thereto storing the binary video data from the buffer means.

26. An apparatus as in claim 25, wherein the buffer means includes, in series, a first serial shift register, a second shift register having serial input and parallel output, and a buffer memory having parallel input, each of these components of the buffer means receiving the storage instructions.

27. An apparatus as in claim 26, wherein the storage instructions include a square wave signal which is generated by a square wave generator, the latter receiving a start signal from a delayed output of a first flip-flop stage and a stop signal from the output of a second flip-flop stage, the second flip-flop stage receiving the sync signal and an output of the first flip-flop stage; and address data from an address counter, the square wave signal being supplied to the first and second shift registers and the address counter, and the address counter further receiving the sync signal.

28. An apparatus for automatically controlling a cutting machine to cut material thereon in accordance with a standard pattern placed at a desired position on the material, the apparatus comprising:

pattern memory means in the cutting machine for storing contour data enabling the cutting machine to cut along a contour defined by the pattern, and storing a corresponding pattern name associated with the contour data; and means for detecting whether coding is present on such pattern, and if so, reading the coding to determine therefrom a pattern name represented by the coding, and to determine the position of the pattern on the cutting machine; and for automatically supplying data indicative of the name and position of the pattern to the cutting machine, and thereby controlling the cutting machine to cut along the contour defined by the pattern at the position of the pattern;

wherein the cutting machine has a work surface, and the detecting and reading means comprises an optical detector on the cutting machine producing a video output signal representative of objects on the work surface;

a digital image memory for storing the video output signal as stored video data; and an image decoding system for receiving the stored video data and determining therefrom whether coding is present on a pattern on the work surface, and if so, generating control data indicative of the name and position of the pattern on the work surface; and wherein the image decoding system comprises a microcomputer including a bi-directional data bus connected for data transfer to an input port, a CPU, a keyboard, a display, a program memory, a working memory, and a data transfer system.

29. An apparatus as in claim 17, and further comprising a standard pattern defining cutting contours, and machine-readable coding within said contours which is representative of the name of said pattern.

30. A method of controlling a cutting machine having a pattern memory, for automatically cutting material in accordance with a plurality of standard patterns, comprising the steps of:

assigning respective names to a plurality of distinct patterns;

storing respective contour data for each pattern, which enable the cutting machine to cut along a contour defined by the pattern, in the pattern memory of the cutting machine, and associating the contour data in the pattern memory with the names of the corresponding patterns;

placing machine-readable coding within the contours of each pattern that is representative of the name of the pattern;

placing the material to be cut onto the cutting machine, and placing such plurality of patterns at desired positions on the material;

automatically detecting whether coding is present on the patterns, and if so, simultaneously reading the coding on all of said patterns to determine therefrom the respective names of the patterns and their respective positions on the cutting machine; and automatically supplying said data indicative of the names and positions of all of the patterns to the cutting machine and thereby controlling the cutting machine to cut along the contours defined by the patterns at the positions of the patterns.

31. An apparatus for automatically controlling a cutting machine to cut machine thereon in accordance with a standard pattern placed at a desired position on the material, the apparatus comprising:

pattern memory means in the cutting machine for storing contour data enabling the cutting machine to cut along a contour defined by the pattern, and storing a corresponding pattern name associated with the contour data; and means for detecting whether coding is present on such pattern, and if so, reading the coding to determine therefrom a pattern name represented by the coding, and to determine the position of the pattern on the cutting machine; and for automatically supplying data indicative of the name and position of the pattern to the cutting machine, and thereby controlling the cutting machine to cut along the contour defined by the pattern at the position of the pattern;

wherein the pattern memory means in the cutting machine is capable of storing respective contour data corresponding to a plurality of patterns, and a corresponding plurality of pattern names associated therewith; and wherein said coding-detecting means is capable of reading the coding on a plurality of said patterns simultaneously to determine therefrom all of the respective pattern names and positions of said patterns, and is capable of automatically supplying all said data indicative of the names and positions of the patterns to the cutting machine.

32. A method of controlling a cutting machine having a pattern memory, for automatically cutting material in accordance with a standard pattern, comprising the steps of:

assigning a name to the pattern;

storing contour data, which enable the cutting machine to cut along a contour defined by the pattern, in the pattern memory of the cutting machine, and associating the contour data in the pattern memory with the name of the corresponding pattern;

placing machine-readable coding on the pattern that is representative of the name of the pattern;

placing the material to be cut onto the cutting machine, and placing the pattern at a desired position on the material;

automatically detecting whether coding is present on the pattern, and if so, reading the coding to determine therefrom the name of the pattern and its position on the cutting machine; and automatically supplying data indicative of the name and position of the pattern to the cutting machine and thereby controlling the cutting machine to cut along the contour defined by the pattern at the position of the pattern;

wherein the data indicative of the position of the pattern include X and Y data indicative of the X-Y displacement of a predetermined portion of the coding from a reference point on the cutting machine, and angle data indicative of the angular displacement of said coding with respect to a reference axis on the cutting machine; and wherein the data indicative of the X-Y displacement comprises variables L1 and L2, which are defined as follows:

$$L1 = X1' + B$$

$$L2 = Y1' + A \text{ ¶}$$

and said angle data indicative of said angular displacement comprises a variable L3, defined as follows:

$$L3 = \tan \text{alpha} = \frac{Y2' - Y1'}{X2' - X1'}$$

wherein the variables L1 and L2 indicate the shifting of one coding mark P1 by the coordinate dimensions X1'+B and Y1'+A, wherein another coding mark P2 has been shifted by the coordinate dimensions X2'+B and Y2'+A, and wherein the angle alpha indicates the angle through which the pattern has been turned, with respect to a machine zero point MN, in conjunction with said shifting of the marks P1 and P2.

33. An apparatus for automatically controlling a cutting machine to cut material on a work surface of said cutting machine, in accordance with a standard pattern placed at a desired position on the material, the apparatus comprising:

pattern memory means in the cutting machine for storing contour data enabling the cutting machine to cut along a contour defined by the pattern, and storing a corresponding pattern name associated with the contour data; and means for detecting whether coding is present on such pattern, and if so, reading the coding to determine therefrom a pattern name represented by the coding, and to determine the position of the pattern on the cutting machine; and for automatically supplying data indicative of the name and position of the pattern to the cutting machine, and thereby controlling the cutting machine to cut along the contour defined by the pattern at the position of the pattern;

wherein the detecting and reading means comprises:

an optical detector on the cutting machine producing a video output signal representative of objects on the work surface;

a digital image memory for storing the video output signal as stored video data; and an image decoding system for receiving the stored video data and determining therefrom whether coding is present on a pattern on the work surface, and if so, generating control data indicative of the name and position of the pattern on the work surface; and wherein said control data indicative of the position of the pattern on the work surface comprises:

data indicative of the X-Y displacement comprising variables L1 and L2, which are defined as follows:

$$L1 = X1' + B$$

$$L2 = Y1' + A$$

and angle data indicative of the angular displacement of the pattern on the work surface, comprising a variable L3, defined as follows:

$$L3 - \tan \text{alpha} = \frac{Y2' - Y1'}{X2' - X1'}$$

wherein the variables L1 and L2 indicate ,the shifting of one coding mark P1 by the coordinate dimensions X1+B and Y1+A, wherein another coding mark, P2 has been shifted by the coordinate dimensions X2'+B and Y2+A, and wherein the angle alpha indicates the angle through which the pattern has been turned, with respect to a machine zero point MN, in conjunction with said shifting of the marks P1 and P2.

* * * * *